United States Patent
Waslowski et al.

(10) Patent No.: US 9,989,641 B2
(45) Date of Patent: Jun. 5, 2018

(54) METHOD OF DETECTING AN OBJECT

(71) Applicant: SICK AG, Waldkirch (DE)

(72) Inventors: Kai Waslowski, Waldkirch (DE); Ulrich Zwölfer, Waldkirch (DE)

(73) Assignee: SICK AG, Waldkirch/Breisgau (DE)

( * ) Notice: Subject to any disclaimer, the term of this patent is extended or adjusted under 35 U.S.C. 154(b) by 0 days. days.

(21) Appl. No.: 15/277,517

(22) Filed: Sep. 27, 2016

(65) Prior Publication Data

US 2017/0090029 A1    Mar. 30, 2017

(30) Foreign Application Priority Data

Sep. 28, 2015   (DE) .......................... 10 2015 116 368

(51) Int. Cl.
*G01S 17/02*   (2006.01)
*G01S 7/486*   (2006.01)

(52) U.S. Cl.
CPC .......... *G01S 17/026* (2013.01); *G01S 7/4865* (2013.01)

(58) Field of Classification Search
CPC .... G01S 17/026; G01S 7/4865; G01S 7/4802; G01S 17/48; G01S 17/50; G01V 8/20; G06K 9/2036
See application file for complete search history.

(56) References Cited

U.S. PATENT DOCUMENTS

| | | | | |
|---|---|---|---|---|
| 6,157,040 A * | 12/2000 | Bauer | ...................... | G01C 3/08 250/221 |
| 6,593,563 B2 * | 7/2003 | Blohbaum | ............... | G01V 8/20 250/208.1 |

(Continued)

FOREIGN PATENT DOCUMENTS

| | | |
|---|---|---|
| DE | 102011005740 A1 | 9/2012 |
| JP | 201459301 | 5/2010 |

(Continued)

OTHER PUBLICATIONS

Jssi-Pekka Jansson et al. "A Multichannel High-Precision CMOS Time-to-Digital Converter for Laser-Scanner-Based Perception Systems", IEEE Transactions on Instrumentation and Measurement, IEEE Service Center, Piscataway, NJ, US, Bd. 61, Nr. 9, Sep. 1, 2012, pp. 2581-2590, XP011455780, ISSN: 0018-9456, D01: 10.1109/TIM.2012.2190343.

(Continued)

*Primary Examiner* — Sang Nguyen
(74) *Attorney, Agent, or Firm* — Nath, Goldberg & Meyer; Jerald L. Meyer

(57) ABSTRACT

The invention relates to a method of detecting an object in which pulses of transmitted light are repeatedly transmitted into a transmission zone by means of a light source; reception light received from the detection zone is detected by means of a detection apparatus which has a plurality of detectors; and an evaluation zone is defined which comprises a plurality of detectors and within which reception light is incident onto the detectors. The method is characterized in that a plurality of part regions are fixed within the evaluation zone; the part regions are at least partly successively evaluated while using a plurality of consecutive pulses of transmitted light; and the evaluations of the part regions are combined to determine the presence of an object in the detection zone.

19 Claims, 1 Drawing Sheet

(56) References Cited

U.S. PATENT DOCUMENTS

| | | | |
|---|---|---|---|
| 8,773,642 B2* | 7/2014 | Eisele | G01C 3/08 356/3.01 |
| 2010/0157278 A1* | 6/2010 | Horsch | G01S 7/4802 356/3.01 |
| 2014/0071433 A1 | 3/2014 | Eisele et al. | |

FOREIGN PATENT DOCUMENTS

| | | |
|---|---|---|
| JP | 201459301 A | 5/2010 |
| JP | 2010190675 A | 9/2010 |
| JP | 2012501435 A | 1/2012 |
| JP | 2012242218 A | 12/2012 |
| WO | 2008152647 A1 | 12/2008 |

OTHER PUBLICATIONS

Japanese office action dated Oct. 31, 2017 for corresponding JP application.

* cited by examiner

METHOD OF DETECTING AN OBJECT

TECHNICAL FIELD

The present invention relates to a method of detecting an object in which pulses of transmitted light are repeatedly transmitted into a detection zone by means of a light source and reception light received from the detection zone is detected by means of a detection apparatus which has a plurality of detectors. In accordance with the method, an evaluation zone is defined which comprises a plurality of detectors and within which reception light is incident onto the detectors.

BACKGROUND

Such methods of detecting an object are used, for example, for a presence control or for detecting moving objects. Such methods can in particular be used in industrial processes in order e.g. to detect articles transported on conveyor belts.

The problem can occur in this respect that e.g. dust particles are present in the air between the object to be detected and the light source and reflect the pulses of transmitted light transmitted by the light source.

A reflective dust particle can be incorrectly identified as an (additional) object, which may result in the triggering of an unwanted switch signal. It can also occur that an incorrect distance is then associated with the object actually to be detected.

Dust or dirt particles can be understood, for example, as any particles suspended in the air such as pollen, abrasion particles and the like.

A reliable suppression of the incorrect recognition of such dust and dirt particles can in particular frequently not be achieved under the premise of a high spatial resolution which is accompanied by a powerful focusing of the transmitted light transmitted by the light source and under the condition of high sensitivity.

SUMMARY

It is the underlying object of the invention to provide a method of the initially named kind which also allows a robust object recognition under difficult, in particular dusty, environmental conditions.

This object is satisfied by a method in accordance with claim 1 and in particular in that a plurality of part regions are fixed within the evaluation zone; the part regions are subsequently at least partly successively evaluated while using a plurality of consecutive pulses of transmitted light; and the evaluations of the part regions are combined to determine the presence of an object in the detection zone.

In other words—instead of the conventional evaluation of the total evaluation zone at one respective point in time—the evaluation of the respective reception light is divided over a plurality of part regions which are evaluated at different points in time, with the part regions also being able to be evaluated simultaneously in some cases. The results of the evaluation of the individual part regions are subsequently combined to determine the presence of an object or to determine that the detection zone is "empty", i.e. free of objects to be detected.

The invention makes use of the recognition that a dust particle is relatively small in comparison with the object to be detected. Accordingly, the light reflected by the dust particle, that is its reception light, is only radiated back onto a small number of detectors of the detection apparatus and thus only in e.g. one part region.

The present description refers in a majority of cases to dust particles. What is described also instead applies, however, to other small interference sources or particles such as pollen, dirt particles or similar, even if only dust particles are named by way of example.

In the conventional evaluation (not in accordance with the invention) of the total evaluation zone over a plurality of pulses of transmitted light of the light source, a signal of the dust particle would now be processed on every pulse, with the signal being summed over a plurality of pulses and thus, e.g. on an energy evaluation, so much energy reflected by the dust particle being evaluated that the dust particle is (incorrectly) recognized as an independent object.

The light radiated back from the dust particle can, for example, only enter into the evaluation once (i.e. on the evaluation of the part region into which the light reflected by the dust particle is incident) due to the division in accordance with the invention over the evaluation of a plurality of part regions after one another. The reception light emanating from the dust particle thus comprises a much smaller energy portion in the total evaluated reception light, namely typically only the nth part with n part regions. Consequently, the dust particle is as a rule not incorrectly recognized as an object since the energy radiated back and entering into the evaluation is not sufficient for a recognition as an object.

The method in accordance with the invention thus makes it possible to avoid an erroneous switching or incorrect measurement even in the presence of dust particles and only to recognize desired objects (e.g. objects of a certain minimum size).

The pulses transmitted by the light source can generally comprise electromagnetic radiation, with, for example, infrared laser light being transmitted into the detection zone. A pulse is the time-limited transmission of transmitted light. A laser is preferably used as the light source.

The detection zone is to be understood as a spatial zone within which objects can or should be recognized.

The transmitted light emitted by the light source is radiated back in the detection zone, for example by reflection or remission, with transmitted light which is radiated back being called reception light. Other light received from the detection zone is called scattered light or extraneous light. It can in particular occur that scattered light or extraneous light is also detected by the detection apparatus and thus by the detectors.

The received light is forwarded to the detection apparatus, for example by means of an optics which preferably comprises a filter. The filter can e.g. be a band pass which only allows the wavelength range of the light source to pass through, whereby a portion of scattered light is held back which is as large as possible.

On the carrying out of the method, the evaluation zone is defined as where the light radiated back (reception light) from the object to be detected is located, i.e. is incident onto the detection apparatus, with a very high likelihood. Pulses of transmitted light can be transmitted into the detection zone for the fixing of the evaluation zone, with an approximate position of the object being able to be determined with reference to the light radiated back and in particular with reference to its intensity. The size and shape of the evaluation zone can in this respect be adapted to the respective application and can preferably be fixedly predefined. The size and shape of the evaluation zone is to be understood as the area bounded by those detectors of the detection apparatus which are associated with the evaluation zone. For example, with a matrix-like arrangement of the detectors on a planar surface, the evaluation zone can be rectangular, square or approximately circular. Alternatively, the evaluation zone can have a shape which is adapted to the contour of the object to be detected. Light incident onto the detection apparatus outside the evaluation zone is not considered in the detection of the object (apart from the fixing of the evaluation zone).

A plurality of part regions are now fixed within the evaluation zone, that is a part area of the evaluation zone is assigned to a respective part region. A part region in this respect comprises at least one detector. The part regions can be selected dynamically in operation, for example in accordance with a predefined pattern or randomly. Alternatively, the part regions can be immutably predefined in advance, that is e.g. on the manufacture of an apparatus carrying out the method.

The part regions are evaluated after one another with a respective one or more pulses. More precisely, pulses are generated by means of the light source, with preferably only exactly one part region being evaluated for each pulse. This means that a detection is e.g. made for the part region whether, at what time, and/or how much light is incident onto the part region from the detection zone. A strong reflection which is accompanied by an intense reception light, in this respect indicates an object in the detection zone.

To distinguish the reception light from scattered light, which portion of the received light is reception light and which portion is scattered light can be determined with reference to the difference of the light incident onto the part region during the pulse in comparison with the light incident onto the part region before and after the pulse.

Once the evaluation has been concluded for one part region, the next part region is evaluated in the same manner, that is one or more pulses of transmitted light are transmitted again and the received light is evaluated.

Once the evaluations have been concluded for all the part regions, the evaluations of the part regions are combined (e.g. by forming a mean value) to conclude the presence of an object in the detection zone or to determine an empty detection zone. If an object has been detected, a switching output can, for example, be activated to indicate the presence of the object.

Advantageous further developments of the invention can be seen from the description, from the dependent claims and from the drawings.

In accordance with a first advantageous embodiment, the position and/or the size of the evaluation zone is fixed with reference to the intensity of the reception light. An advance evaluation of all detectors of the detection apparatus can take place for this purpose to obtain an estimate of the zone of the detection apparatus in which reception light of an object could be incident. This estimate can, for example, take place with reference to the intensity of the reception light, that is over the counting of the number of photons received. The position of an assumed object can thus be determined at least roughly. The evaluation zone can then be positioned such that the light radiated back from the object, i.e. the associated reception light, is incident onto the detection apparatus within the evaluation zone. The size and the allowed positions of the evaluation zone can be fixedly predefined and can, for example, be fixed during an installation or calibration of a corresponding apparatus.

The area of at least one part region is preferably rectangular or square. The part region or part regions can each define a contiguous area which has a fixedly predefined geometrical shape. The part regions can also be selected as substantially round or elliptical in addition to the named rectangular or square part region. With a rectangular or square part region, the side aspect of the part region can correspond to the side aspect of the area covered by all the detectors of the detection apparatus.

All the part regions can in particular have the same shape.

In accordance with a further advantageous embodiment, each part region covers the same number of detectors. The part regions can, for example, respectively comprise one, four, nine, sixteen or twenty-five detectors. The part regions can equally be selected such that with a matrix-like arrangement of the detectors, each second, third, fourth, eighth or tenth detector can e.g. be associated with a part region. The detectors of a part region then do not form a contiguous area, but do line within the evaluation zone.

In accordance with another advantageous embodiment, the area of at least one part region is arranged in a distributed manner. In other words, a part region can be composed of a plurality of areas. The areas can in this respect be arranged spaced apart from one another, i.e. it is possible that a part region does not form any contiguous area.

In accordance with a further advantageous embodiment, at least two of the part regions overlap at least regionally or are adjacent to one another. With two overlapping part regions, at least one detector is associated with both part regions and is accordingly considered in the evaluation of both part regions. With mutually adjacent part regions, at least one detector of the one part region is directly adjacent to a detector of the other part region.

All the part regions are particularly preferably selected as different. This means that preferably no two part regions are identical, i.e. do not coincide in shape and position. Alternatively, two or more part regions can also be selected as identical in order then to be evaluated a plurality of times at different times, which can be of advantage with fast-moving dust particles.

In accordance with a further advantageous embodiment, more than one pulse, preferably at least 50 pulses, particularly preferably at least 250 pulses, of transmitted light are used for the evaluation of each part region. The light source therefore transmits at least 250 pulses, for example, into the detection zone for the evaluation of each part region, with the received light being measured at least 250 times at all detectors of the respective part region. Alternatively, only a maximum of 10 or a maximum of 100 pulses can e.g. be used for the evaluation of every part region. Each pulse of transmitted light can have a duration of <1 nanosecond, preferably of <500 picoseconds, particularly preferably of <300 picoseconds.

In order not to extend a measurement duration with respect to a conventional measurement, the conventionally used number of pulses for a measurement can be spread evenly over the part regions. For example, on the typical use of 1000 pulses and four part regions, the named 250 pulses per part region can be used.

In accordance with a further advantageous embodiment, the order of the evaluation of the part regions is fixed in dependence on the distance of the respective part region from a reference point. The reference point can, for example, be the center of the evaluation zone. An angle which the part region, for example, includes with a vertical axis in the evaluation zone can also be bused in addition to the distance.

A time offset between the transmitted light transmitted and the reception light received is particularly preferably determined to determine the presence and/or the distance of an object in the detection zone. The presence and/or the distance of an object in the detection zone can therefore be determined, for example, using the time duration between the transmission of the transmitted light and the detection of the associated reception light. In general times, a so-called time of flight (TOF) process can thus be used to carry out an object detection. This makes it possible, for example, only to indicate objects at a specific distance, for example at a distance of 800 mm to 1200 mm, as a detected object. Objects outside this region are then not indicated as objects. The size of the detection zone can therefore in particular also be set in the distance direction. In addition to the time of flight process, the intensity of the reception light can also be used for the object recognition.

The detectors are further preferably single-photon avalanche diodes (SPADs). The detectors can generally also be avalanche diodes. The avalanche diodes can be operated in the Geiger mode in which a single photon can already trigger an electron avalanche which produces an electrical signal which is simple to detect. Such detectors thus allow a very sensitive measurement and do not require any amplifier elements, whereby dark objects can also be easily recognized and the space for the amplifiers can be saved.

The respective detector is not sensitive to further incident photons during an avalanche due to the avalanche which can e.g. last for between 20 and 50 nanoseconds. The detectors can consequently have a dead time of between 20 and 50 nanoseconds.

At least some of the detectors are particularly preferably coupled to time-to-digital converters (TDCs) to determine the time duration between the transmission of the transmitted light and the detection of the reception light. A time-to-digital converter is a component which can detect brief time intervals and can output them digitally. Such a TDC can have a time resolution of better than one nanosecond, preferably of better than 100 picoseconds. The distance from an object can thus be determined relatively exactly by means of the TDCs.

In accordance with a further advantageous embodiment, only those detectors are coupled to a respective time-to-digital converter which are in the part region which is evaluated at a respective point in time.

The use of TDCs can be complex and expensive so that it is typically desired to use as few TDCs as possible. It is made possible to use fewer TDCs on the basis of the spreading of the evaluation over a plurality of part regions, whereby the method can be carried out less expensively and more economically. The part regions can in particular be selected such that so many detectors are provided at a maximum in each part region as TDCs are present. For example, 25 TDCs can be present in an apparatus, with a part region comprising a maximum of 25 detectors. The 25 TDCs can then be connected one after the other to the respective 25 detectors of every part region. Such an interconnection can preferably be carried out by means of a switching matrix. For example, at least twenty times more detectors than TDCs can generally be provided.

A further subject of the invention is an apparatus for the detection of an object having a light source and having a detection apparatus which has a plurality of detectors. The apparatus has a control unit which is configured to carry out the above-explained method.

The detectors of the apparatus are preferably single-photon avalanche diodes (SPADs). At least some of the detectors are further preferably coupled to time-to-digital converters (TDCs).

The explanations on the method in accordance with the invention apply accordingly to the apparatus in accordance with the invention, in particular with respect to advantages and preferred embodiments.

BRIEF DESCRIPTION OF THE DRAWINGS

The invention will be described in the following purely by way of example with reference to the drawings. There are shown.

DETAILED DESCRIPTION

Figure 1:
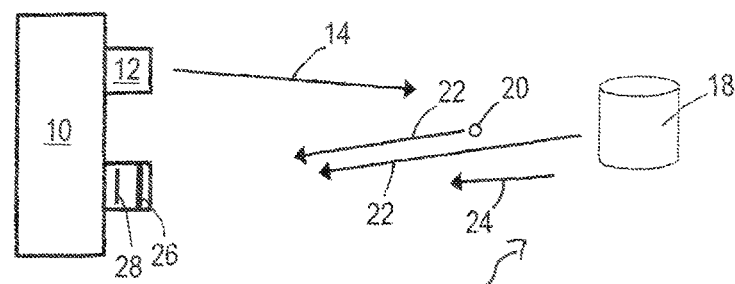
FIG. 1 an apparatus in accordance with the invention in a schematic view.

FIG. 1 shows an object recognition apparatus 10 which comprises a light source 12 in the form of a laser diode. The light source 12 repeatedly irradiates pulses of laser light; that is transmitted light 14, into a detection zone 16. An object 18 and a dust particle 20 are located in the detection zone 16.

Both the object 18 and the dust particle 20 radiate the transmitted light 14 back to the object recognition apparatus 10 in the form of reception light 22. The object detection apparatus 10 is also exposed to scattered light 24 in addition to the reception light 22. The received light 22, 24 is filtered by means of an optics 26 and is projected onto a detection apparatus 28.

Figure 2:
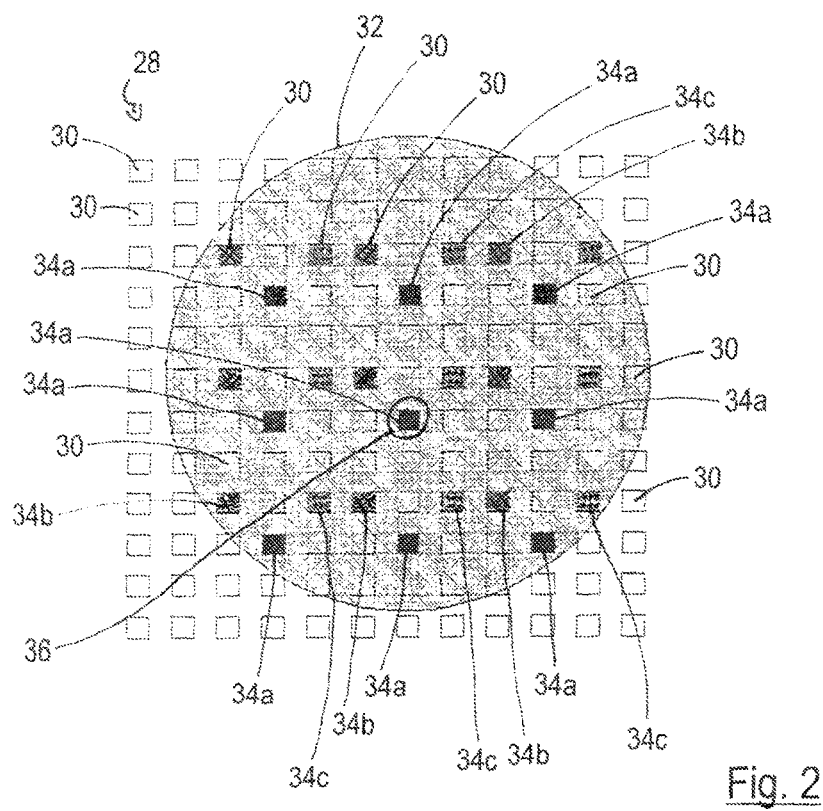
FIG. 2 a detection apparatus in a schematic view.

The detection apparatus 28 is shown in plan view in FIG. 2. The detection apparatus 28 comprises a plurality of detectors 30 which are configured as single-photon avalanche diodes (SPADs). The detectors 30 are arranged in a uniform, matrix-like pattern. A respective nine of the detectors 30 can be electrically connected by means of a switching matrix (not shown) to nine time-to-digital converters (TDCs—likewise not shown).

A circular evaluation zone 32, that is a so-called "region of interest" (ROI), is drawn in FIG. 2. The evaluation zone is defined with reference to intensity determinations of the incident light 22, 24 and lies approximately at the position at which the reception light 22 reflected back by the object 18 is projected onto the detection apparatus 28. Three part regions 34, 34b, 34c, which each comprise nine detectors 30, are defined within the evaluation zone 32. The part regions 34 are each formed by detectors 30 which are arranged non-adjacent to one another here. The part regions 34 accordingly respectively form non-contiguous areas. Reception light 22 emanating from the dust particle 20 is projected onto the detection apparatus 28 within the evaluation zone 32 and at the position of a detector 30 belonging to the part region 34a. This zone is called a false detection zone 36 here.

In the operation of the object recognition apparatus 10, the light source 12 repeatedly transmits pulses of transmitted light 14 into the detection zone, 18 whereupon the evaluation zone 32 is fixed with reference to the intensity differences between the reception light 22 and the scattered light 24.

Always the same three part regions 34 are subsequently used within the evaluation zone. After the fixing of the evaluation zone 32 and after the accompanying fixing of the part regions 34, the evaluation of the part region 34a is first begun. For this purpose, the light source 12 transmits two hundred and fifty pulses of transmitted light 14 into the detection zone 18, with a distance value being determined by means of the nine detectors 30 which are associated with the part region 34a and by means of the TDCs coupled to the detectors 30.

In this respect, the detector 30 disposed in the false detection zone 36 delivers an incorrect value in the part region 34a which emanates from the dust particle 20. The evaluation of the part region 34a takes place, for example, by a mean formation over all distance values determined in the part region 34a. An intensity measurement can also be carried out in addition to the distance values.

After the conclusion of the evaluation for the part region 34a, in which a result distance value is calculated, a move is made to the next part region 34b, with the nine present TDCs now being coupled to the detectors 30 from the part region 34b.

250 pulses of transmitted light 14 are now again also transmitted into the detection zone 16 here. As already explained, a distance measurement is now carried out by means of the detectors 30 of the part region 34b for each of the 250 pulses. Since the part region 34b does not encompass the false detection zone 36, a distance from the object 18 and not from the dust particle 20 is respectively correctly detected by means of the detectors 30 of the part region 34b. The result distance value calculated for the part region 34b consequently indicates the distance from the object 18 with a high precision.

The procedure is carried out in a corresponding manner for the part region 34c. On the common evaluation of all part regions 34, it is now of advantage that the false detection zone 36, that is the dust particle 20, is only considered at all in a third of the measurements and accordingly the total result of the measurement, i.e. the combination or the average of the result distance value, is only minimally falsified. The presence and the distance of the object 18 from the object detection apparatus 10 can thus be determined robustly, reliably and exactly.

REFERENCE NUMERAL LIST

10 object recognition apparatus
12 light source
14 transmitted light
16 detection zone
18 object
20 dust particle
22 reception light
24 scattered light
26 optics
28 detection apparatus
30 detector
32 evaluation zone
34a-34c part regions
36 false detection zone

The invention claimed is:

1. A method of detecting an object using a control unit, the method comprising the steps of:
    repeatedly transmitting pulses of transmitted light from a light source into a detection zone;
    detecting, with a detection apparatus, reception light received from the detection zone, with the detection apparatus having several detectors;
    defining an evaluation zone, with the evaluation zone comprising several detectors and with reception light being incident onto the detectors in the evaluation zone;
    determining a plurality of part regions within the evaluation zone;
    at least partly evaluating the plurality of part regions at different times using a plurality of different, consecutive pulses of transmitted light, wherein a false detection zone is established when a detector in a part region detects a presence of a particle; and
    combining the evaluations of the plurality of part regions to determine the presence of an object in the detection zone, wherein any incorrect value from the particle in the false detection zone is minimized by the combination of the evaluations of the plurality of part regions.

2. The method in accordance with claim 1,
    further comprising the step of:
    determining at least one of a position and a size of the evaluation zone with reference to
    an intensity of the reception light.

3. The method in accordance with claim 1,
    wherein each of the plurality of part regions comprises the same number of detectors.

4. The method in accordance with claim 1,
    wherein the area of at least one of the plurality of part regions is arranged in a distributed manner, is rectangular or is square.

5. The method in accordance with claim 1,
    wherein at least two of the plurality of part regions at least regionally overlap or are adjacent to one another.

6. The method in accordance with claim 1,
    wherein all of the plurality of part regions are selected as different.

7. The method in accordance with claim 1,
    wherein more than one pulse of transmitted light is used for the evaluation of each of the plurality of part regions.

8. The method in accordance with claim 1,
    wherein at least 50 pulses of transmitted light are used for the evaluation of each of the plurality of part regions.

9. The method in accordance with claim 1,
    wherein at least 250 pulses of transmitted light are used for the evaluation of each of the plurality of part regions.

10. The method in accordance with claim 1,
    wherein the order of the evaluation of the plurality of part regions is determined in dependence on the distance of the respective one of the plurality of part regions from a reference point.

11. The method in accordance with claim 1,
    further comprising the step of:
    determining at least one of a presence and distance of an object in the detection zone with reference to the time duration between the transmission of the transmitted light and the detection of the reception light.

12. The method in accordance with claim 1,
    wherein the detectors are single-photon avalanche diodes.

13. The method in accordance with claim 1,
    wherein the detectors are coupled to time-to-digital converters to determine the time duration between the transmission of the transmitted light and the detection of the reception light.

14. The method in accordance with claim 13,
    wherein only those detectors are coupled to a respective time-to-digital converter which lie in the one of the plurality of part regions which is evaluated with respect to a respective point in time.

15. The method in accordance with claim 1, wherein the detection apparatus has a plurality of detectors and the evaluation zone is defined by some of the plurality of detectors.

16. The method in accordance with claim 15, wherein the plurality of detectors is arranged in an array and the evaluation zone is defined by a region of the array.

17. An apparatus for the detection of an object, comprising
a light source,
a detection apparatus which has several detectors, and
a control unit, with the control unit being configured to carry out a method of detecting an object, the method comprising the steps of:
repeatedly transmitting pulses of transmitted light from the light source into a detection zone;
detecting, with the detection apparatus, reception light received from the detection zone;
defining an evaluation zone which comprises several detectors and within which reception light is incident onto the detectors,
determining a plurality of part regions within the evaluation zone;
at least partly evaluating the plurality of part regions at different times using a plurality of different, consecutive pulses of transmitted light, wherein a false detection zone is established when a detector in a part region detects a presence of a particle; and
combining the evaluations of the plurality of part regions to determine the presence of an object in the detection zone, wherein any incorrect value from the particle in the false detection zone is minimized by the combination of the evaluations of the plurality of part regions.

18. The apparatus in accordance with claim 17,
wherein the detectors are single-photon avalanche diodes.

19. The apparatus in accordance with claim 17,
wherein at least some of the detectors are coupled to time-to-digital converters.

* * * * *